United States Patent
Wolf et al.

(10) Patent No.: US 7,758,131 B1
(45) Date of Patent: Jul. 20, 2010

(54) VEHICLE WHEEL COVER RETENTION SYSTEM AND METHOD FOR PRODUCING SAME

(75) Inventors: Joseph W. Wolf, Canton, MI (US); Patrick McCorry, Plymouth, MI (US); James A. Wieland, Mason, MI (US); Ross S. Hill, Lansing, MI (US); Robert J. Wendt, White Lake, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 76 days.

(21) Appl. No.: 11/585,324

(22) Filed: Oct. 23, 2006

Related U.S. Application Data

(60) Provisional application No. 60/729,700, filed on Oct. 24, 2005, provisional application No. 60/729,721, filed on Oct. 24, 2005.

(51) Int. Cl.
*B60B 7/08* (2006.01)
(52) U.S. Cl. .................... 301/37.43; 301/37.102
(58) Field of Classification Search ........... 301/37.101, 301/37.102, 37.11, 37.12, 37.105, 37.41, 301/37.42, 37.43, 37.35, 37.36, 37.27, 37.32, 301/37.33, 108.3
See application file for complete search history.

(56) References Cited

U.S. PATENT DOCUMENTS

| | | | | |
|---|---|---|---|---|
| 2,274,496 A | * | 2/1942 | Mulhern | 301/37.24 |
| 2,304,583 A | * | 12/1942 | Lyon | 301/37.34 |
| 2,386,235 A | * | 10/1945 | Lyon | 301/37.23 |
| 2,963,318 A | * | 12/1960 | Lyon | 301/37.35 |
| 3,661,425 A | | 5/1972 | Verdier | |
| 3,726,566 A | * | 4/1973 | Beith | 301/37.11 |
| 4,070,066 A | | 1/1978 | Reppert et al. | |
| 4,585,276 A | | 4/1986 | Tirheimer | |
| 4,671,575 A | * | 6/1987 | Pfeiffer et al. | 301/37.35 |
| 6,007,158 A | * | 12/1999 | Maloney et al. | 301/37.43 |
| 6,641,224 B1 | | 11/2003 | Heck et al. | |
| 7,025,844 B2 | * | 4/2006 | Chase et al. | 156/79 |
| 7,264,316 B2 | * | 9/2007 | DiMarco et al. | 301/37.105 |
| 2005/0206220 A1 | * | 9/2005 | Polka | 301/37.105 |

\* cited by examiner

*Primary Examiner*—S. Joseph Morano
*Assistant Examiner*—Kip T Kotter
(74) *Attorney, Agent, or Firm*—MacMillan, Sobanski & Todd, LLC

(57) ABSTRACT

This invention relates to a vehicle wheel cover retention system for securing a wheel cover to a vehicle wheel. According to one embodiment, the vehicle wheel cover retention system is for a non-full face fabricated vehicle wheel and comprises: a full outer wheel rim formed from a suitable material and including a first rim flange, a first tire bead seat, a well, a second tire bead seat, and a second rim flange, the full outer wheel rim defining a first surface extending between the first an second rim flanges; an inner wheel disc defining a wheel axis and formed from a suitable material and joined to the full outer wheel rim, the inner wheel disc including a centrally located wheel mounting surface and an outer annular portion, the inner wheel disc having a first surface and a second surface; and a wheel cover formed from a suitable material and secured to at least one of the first surface of the inner wheel disc, the second surface of the inner wheel disc, and the first surface of said full outer wheel rim.

20 Claims, 16 Drawing Sheets

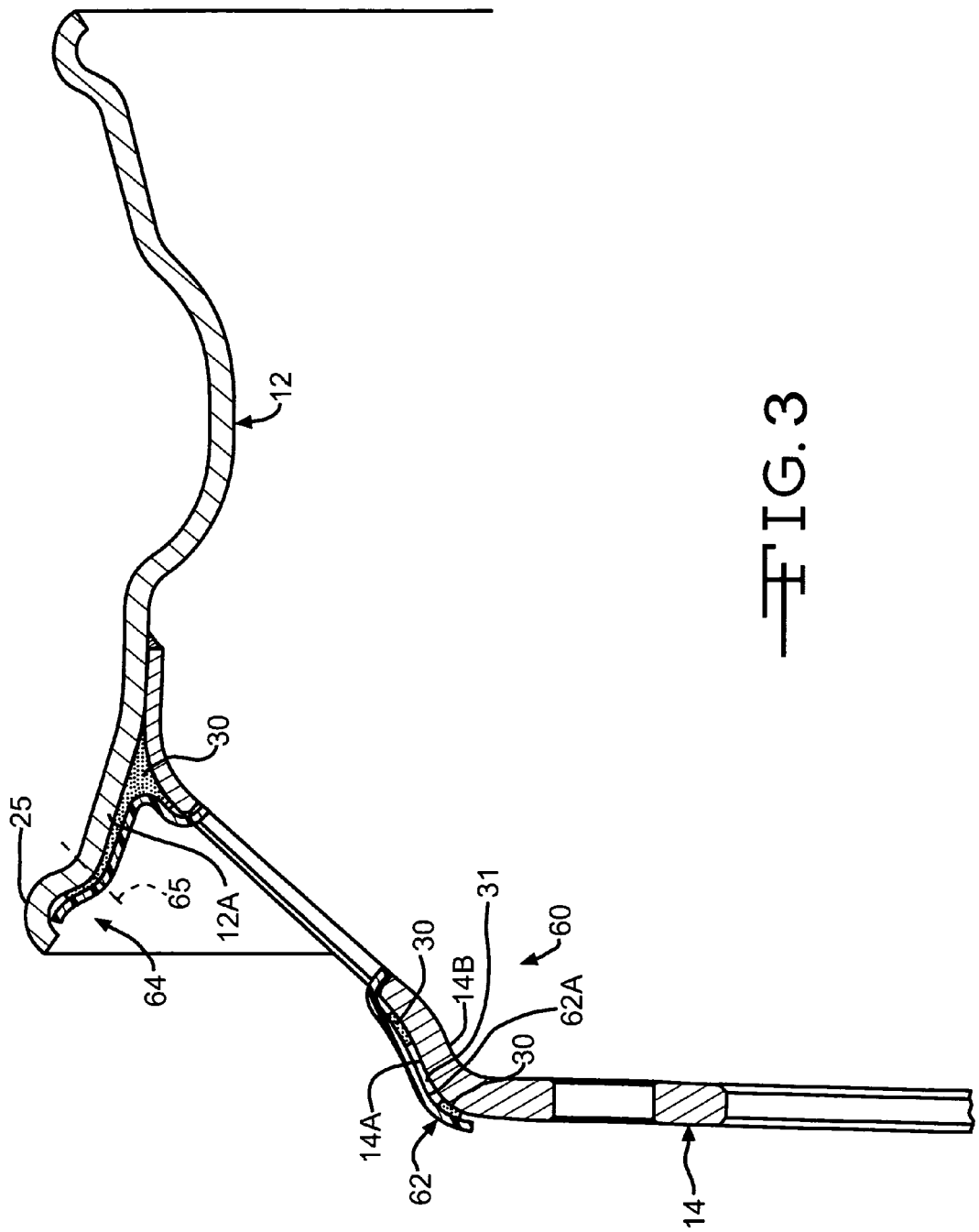

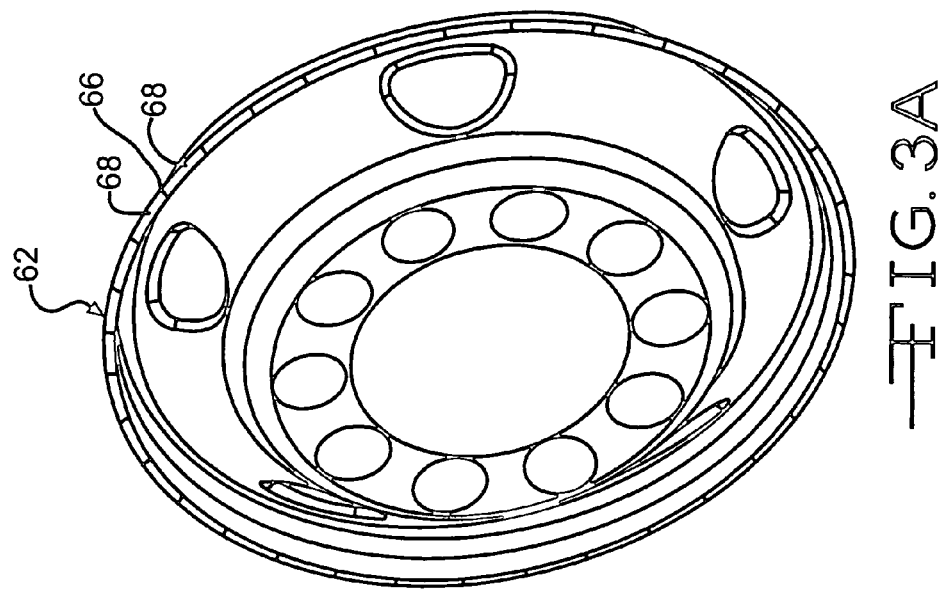
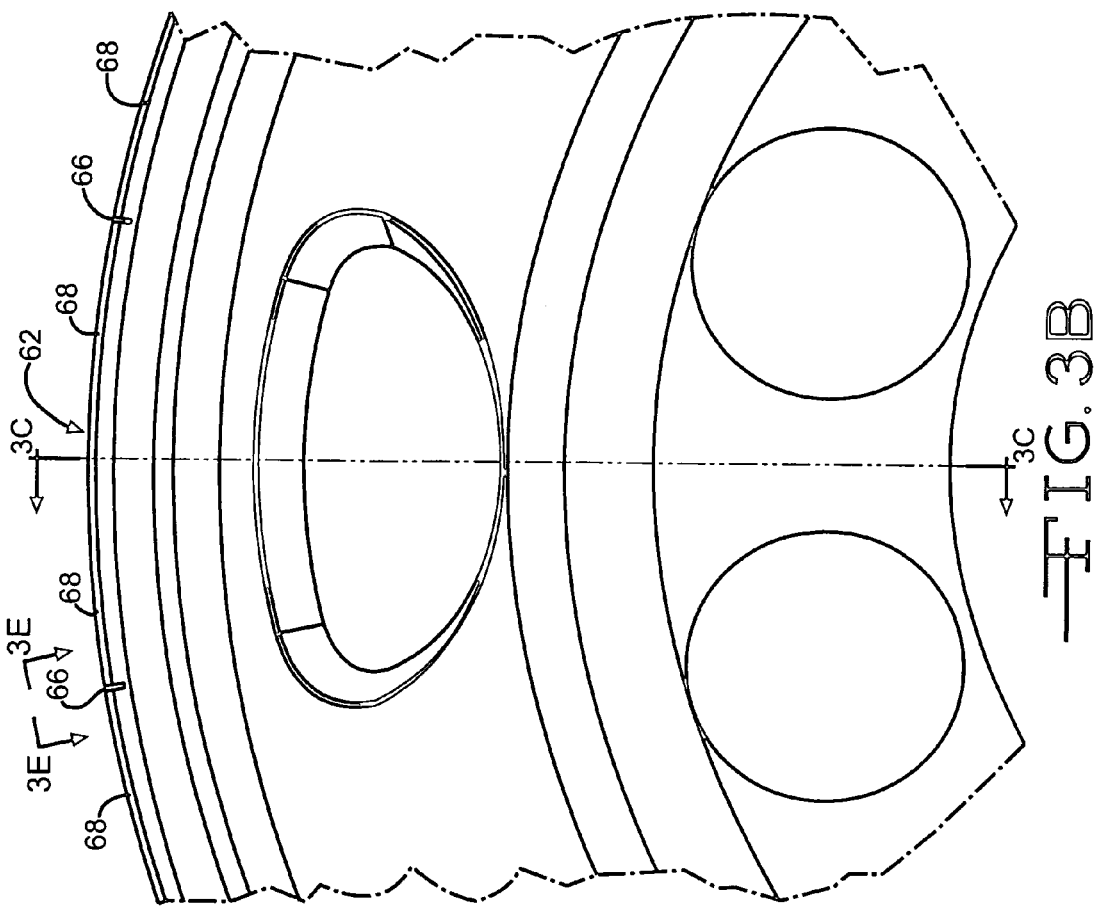
FIG. 3A
FIG. 3B

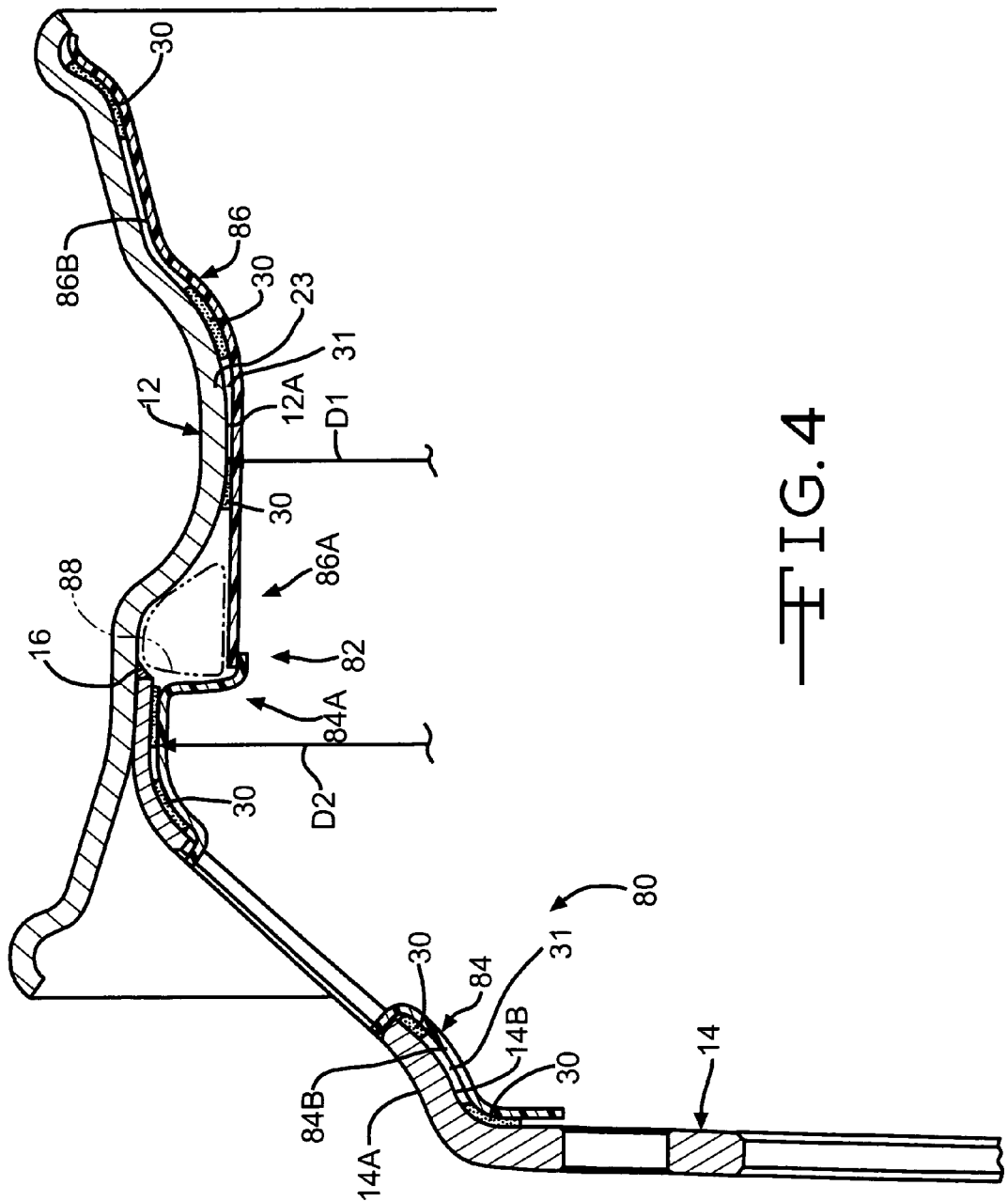

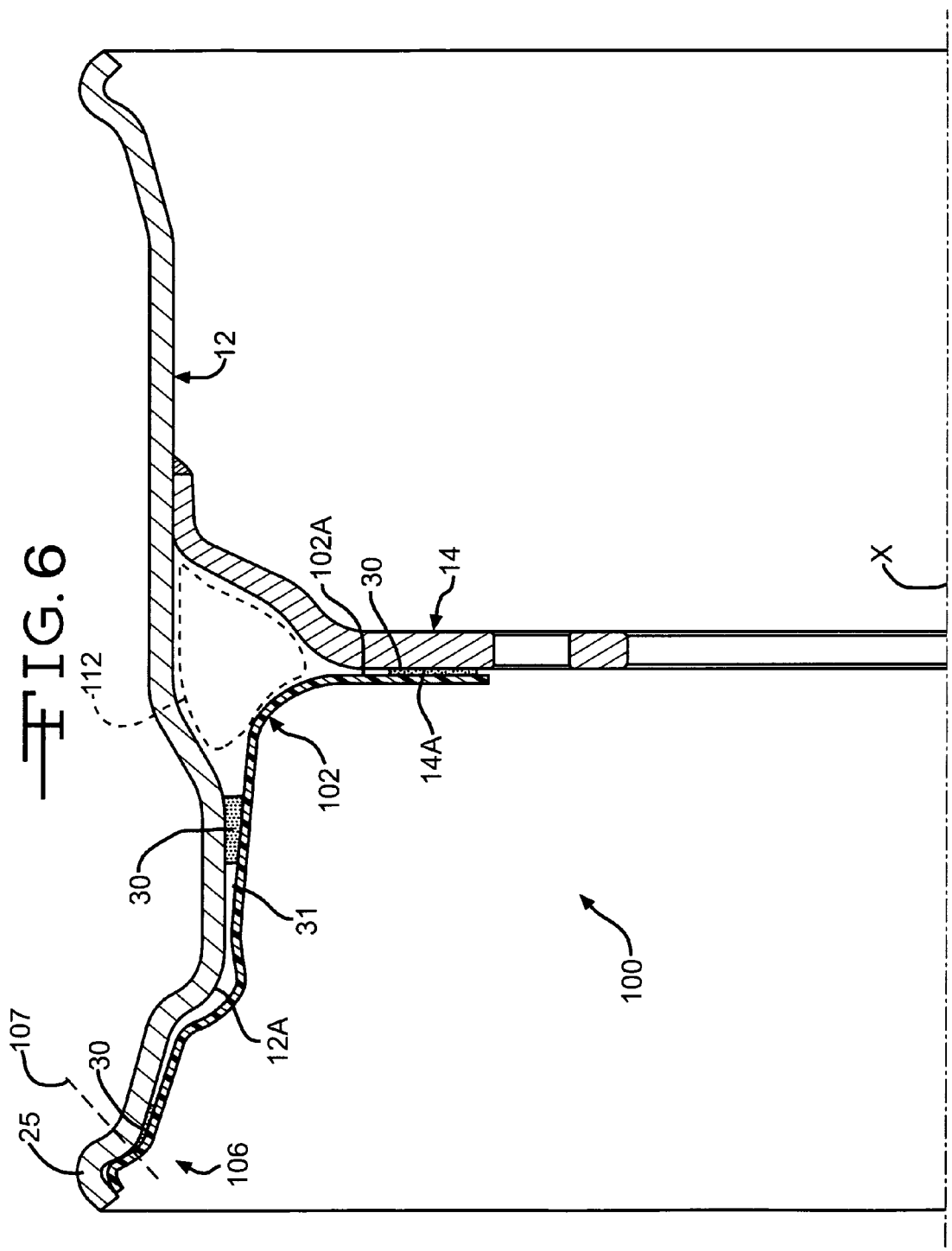

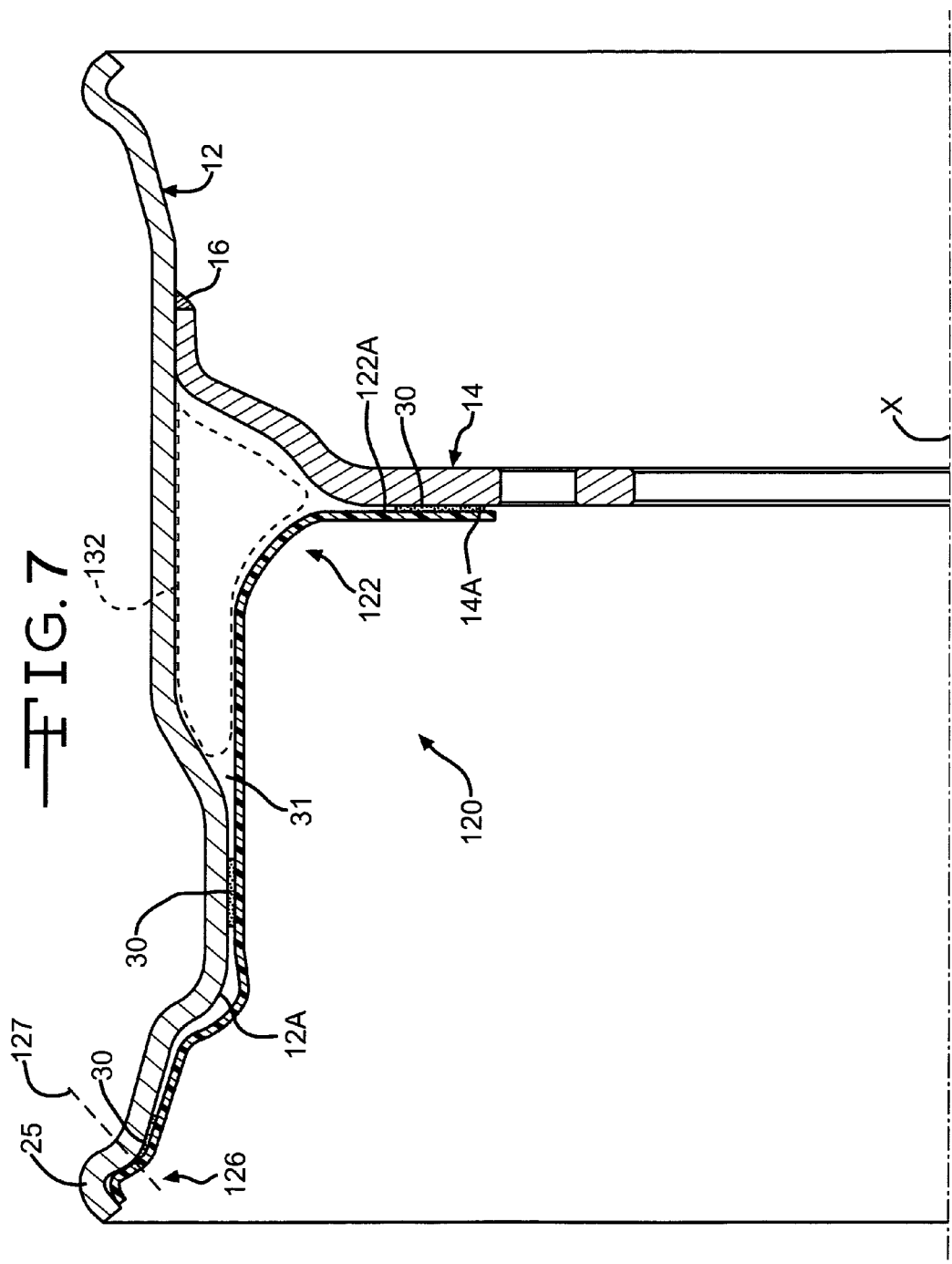

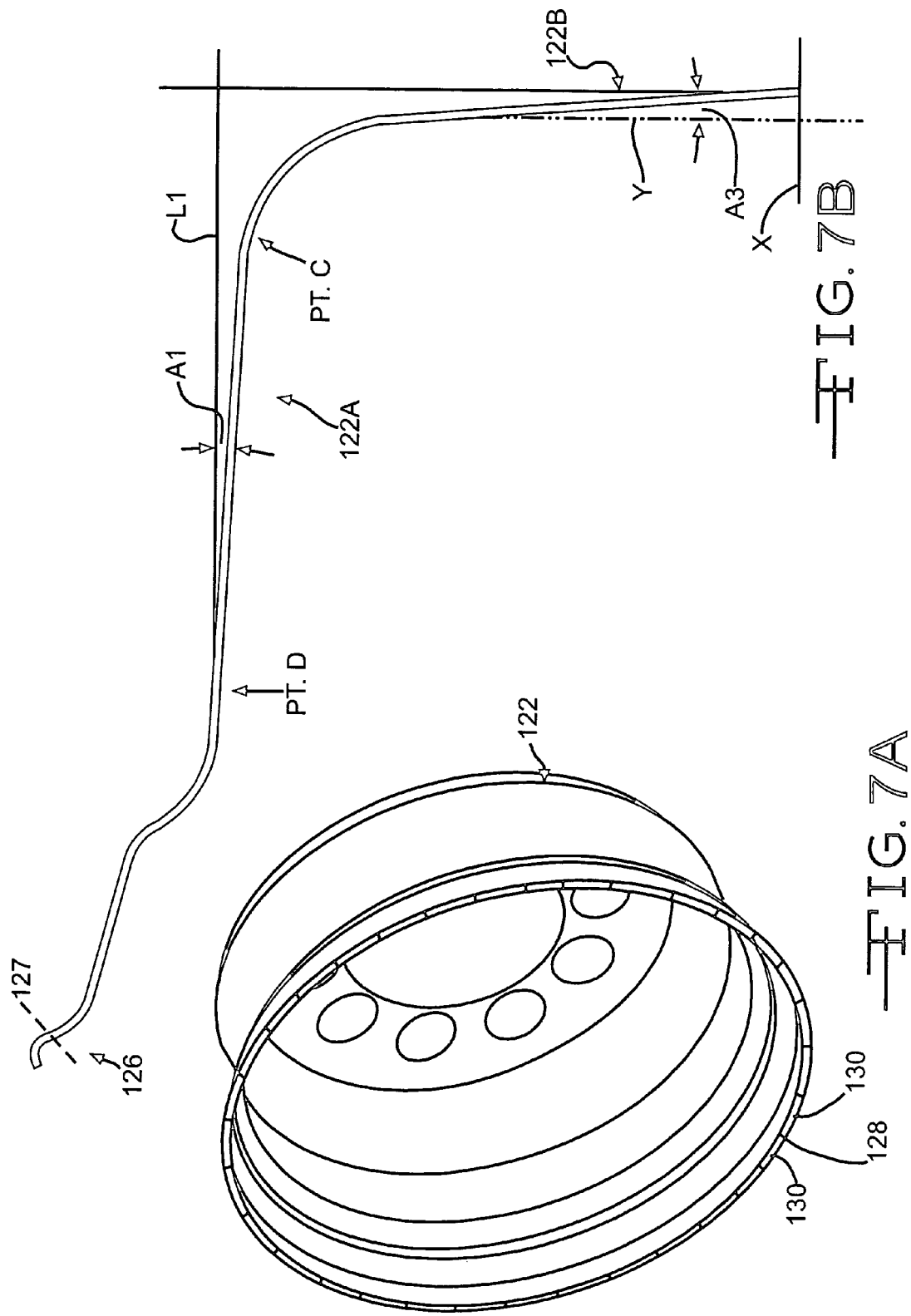

VEHICLE WHEEL COVER RETENTION SYSTEM AND METHOD FOR PRODUCING SAME

CROSS-REFERENCE TO RELATED APPLICATIONS

This application claims the benefit of U.S. Provisional Application Ser. No. 60/729,700, filed Oct. 24, 2005, and U.S. Provisional Application Ser. No. 60/729,721, filed Oct. 24, 2005.

BACKGROUND OF THE INVENTION

This invention relates in general to vehicle wheels and, in particular, to an improved vehicle wheel cover retention system and method for producing the same.

A conventional fabricated vehicle wheel is typically of a two-piece construction and includes an inner wheel disc and a full outer wheel rim. The wheel disc is typically fabricated from steel, and includes a centrally located wheel mounting surface. The wheel mounting surface is provided with a center pilot or hub hole, and a plurality of lug receiving holes for mounting the wheel to an axle of the vehicle. The wheel rim is typically fabricated from steel, and includes an inboard tire bead seat retaining flange, an inboard tire bead seat, an axially extending well, an outboard tire bead seat, and an outboard tire bead seat retaining flange. Typically, the wheel disc and the wheel rim are joined together during a welding operation in one of two manners. Either, the wheel disc is joined to the wheel rim in the region of the bead seat to produce a "bead-seat attached" wheel or the wheel disc is welded to the wheel rim in the region of the well to produce a "drop well attached" wheel.

A conventional dual vehicle wheel assembly includes a pair of vehicle wheels which are secured to a rear axle flange of an associated vehicle for supporting a pair of tires in a side-by-side relationship. Basically, there are four main types of rear dual vehicle wheels for light, medium, or heavy duty vehicles, namely "fabricated" dual wheels, "forged" dual wheels, cast aluminum dual wheels, and "combination" dual wheels.

A conventional fabricated dual wheel includes an inner wheel and an outer wheel which are connected together to form the dual wheel. Each of the associated inner and outer wheels is typically of a two-piece construction and includes an inner wheel disc and an outer wheel rim. The wheel disc is typically fabricated from steel, and includes a centrally located wheel mounting surface. The wheel mounting surface is provided with a center pilot or hub hole, and a plurality of lug receiving holes for mounting the wheel to an axle of the vehicle. The wheel rim is typically fabricated from steel, and includes an inboard tire bead seat retaining flange, an inboard tire bead seat, an axially extending well, an outboard tire bead seat, and an outboard tire bead seat retaining flange. The wheel disc and the wheel rim are joined together during a welding operation in one of two manners. Either, the wheel disc is joined to the wheel rim in the region of the bead seat to produce a "bead-seat attached" wheel, or the wheel disc is welded to the wheel rim in the region of the well to produce a "drop well attached" wheel. Then, the inner wheel and outer wheel are disposed with their discs adjacent one another and with the lug holes of each aligned so that lug bolts can extend through the holes to secure the inner and outer wheels to the axle.

SUMMARY OF THE INVENTION

This invention relates to a vehicle wheel cover retention system for securing a wheel cover to a vehicle wheel. According to one embodiment, the vehicle wheel cover retention system is for a non-full face fabricated vehicle wheel and comprises: a full outer wheel rim formed from a suitable material and including a first rim flange, a first tire bead seat, a well, a second tire bead seat, and a second rim flange, the full outer wheel rim defining a first surface extending between the first an second rim flanges; an inner wheel disc defining a wheel axis and formed from a suitable material and joined to the full outer wheel rim, the inner wheel disc including a centrally located wheel mounting surface and an outer annular portion, the inner wheel disc having a first surface and a second surface; and a wheel cover formed from a suitable material and secured to at least one of the first surface of the inner wheel disc, the second surface of the inner wheel disc, and the first surface of said full outer wheel rim.

Other advantages of this invention will become apparent to those skilled in the art from the following detailed description of the preferred embodiments, when read in light of the accompanying drawings.

BRIEF DESCRIPTION OF THE DRAWINGS

FIG. 3 is an enlarged view of a portion of a vehicle wheel including a third embodiment of a wheel cover retention system.

FIGS. 3A to 3E are selected views of the vehicle wheel illustrated in FIG. 3.

FIG. 4 is an enlarged view of a portion of a vehicle wheel including a third embodiment of a wheel cover retention system.

FIG. 6 is an enlarged view of a portion of a vehicle wheel including a sixth embodiment of a wheel cover retention system.

FIG. 7 is an enlarged view of a portion of a vehicle wheel including a seventh embodiment of a wheel cover retention system.

FIGS. 7A and 7B are selected views of the vehicle wheel illustrated in FIG. 7.

DETAILED DESCRIPTION OF THE PREFERRED EMBODIMENTS

Figure 1:
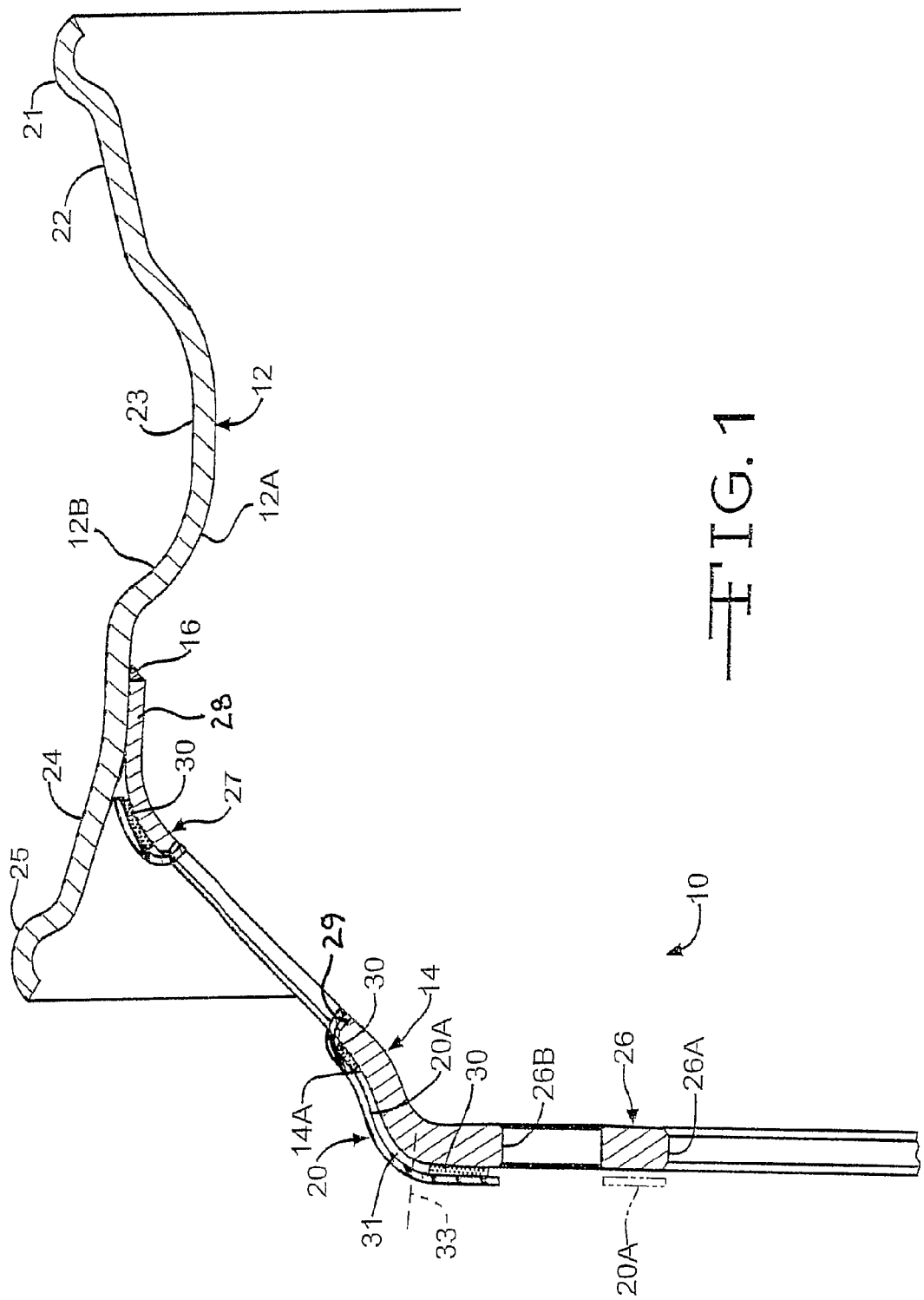
FIG. 1 is an enlarged view of a portion of a vehicle wheel including a first embodiment of a wheel cover retention system.

Referring now to the drawings, there is illustrated in FIG. 1 a portion of a vehicle wheel, indicated generally at 10, including a first embodiment of a wheel cover retention system. The vehicle wheel 10 is illustrated as being a high-offset fabricated type of vehicle wheel (i.e., a non-full face fabricated type of vehicle wheel), and includes a full outer rim 12 and an inner disc 14 secured together by suitable means, such as for example, a weld 16. The rim 12 and the disc 14 may be formed by any suitable processes and can be formed from suitable materials, such as for example, steel, aluminum and alloys thereof. The vehicle wheel 10 in this embodiment is preferably for use in commercial vehicles, as either a single wheel assembly or as part of a dual wheel assembly, but may be used in conjunction with light, medium, or heavy duty vehicles if so desired. Also, it is to be understood that the terms "inner" surface and "outer" surface as used herein are not meant to be limiting in any way and depend on whether the wheel is used in a single wheel assembly or in a dual wheel assembly and the orientation of such wheels in such assemblies. For example, the outer surface of a wheel in a single wheel assembly may become the inner surface of the wheel if that wheel is used as the inner wheel of a dual wheel assembly. Also, although this invention will be described and illustrated in connection with the particular vehicle wheels disclosed herein, it will be appreciated that the invention may be used in conjunction with other kinds of vehicle wheels if so desired.

In the illustrated embodiment, the wheel rim 12 includes a first rim flange 21, a first tire bead seat 22, a generally axially extending well 23, a second tire bead seat 24, and a second rim flange 25. The wheel rim 12 defines a first or inner surface 12A and a second or outer surface 12B extending between the rim flanges 21 and 25. Alternatively, the construction material and/or make-up of the wheel rim 12 may be other than illustrated if so desired.

In the illustrated embodiment, the wheel disc 14 includes a generally centrally located wheel mounting surface or portion 26, an outer annular portion 27. The wheel mounting surface 26 of the wheel disc 14 is provided with a centrally located pilot aperture 26A and a plurality of lug bolt receiving holes 26B circumferentially spaced around the pilot aperture 26A (only one of such lug bolt receiving holes 26B illustrated in FIG. 1). The lug bolt receiving holes 26B receive lug bolts (not shown) and nuts (not shown) for securing the vehicle wheel 10 on an axle (not shown) of a vehicle. In this embodiment, the wheel disc 14 also includes one or more vent windows 29 formed therein (only one of such windows 29 illustrated in FIG. 1). The outer annular portion 27 includes a flange 28. The flange 28 is disposed adjacent a portion of the rim 12 and a weld 16 is provided to join the rim 12 and disc 14 together. Alternatively, the construction, material and/or make-up of the wheel disc 14 may be other than illustrated if so desired.

As shown in FIG. 1, the vehicle wheel 10 includes a wheel cover 20 secured to a first or outer surface 14A of the disc 14. The wheel cover 20 can be formed of any suitable material, such as plastic or metal, and can be treated or coated to produce a desired surface finish. Preferably, the cover 20 is a one-piece integral cover but may be otherwise formed if so desired. In the illustrated embodiment, the wheel cover 20 is provided with a profile which generally corresponds to the adjacent outer surface 14A or profile of the disc 14. Alternatively, the profile of the cover 20 may be other than illustrated if so desired.

In this embodiment, the cover 20 is shown as extending inwardly or downwardly adjacent to the lug bolt receiving holes 26B. Such a cover 20 would preferably be used in a single wheel assembly wherein the cover 20 is on the outboard side of the wheel. If the wheel 10 were to be used in a dual wheel assembly as the inner wheel, the cover 20 would preferably terminate further outwardly or upwardly from the lug bolt receiving holes 26B (i.e., approximately above dashed line 33), so that when another wheel (i.e., the outer wheel), is mounted in a back-to-back relationship against the mounting surface 26 of the inner wheel 10, the cover 20 would not be disposed between the associated mounting surfaces of the two wheels which are clamped against each other when the wheels are mounted on the vehicle. Alternatively, the wheel cover 20 may include an inner portion shown by in phantom in FIG. 1 at reference number 20A which extends inwardly past the lug bolt receiving holes 26B to the pilot aperture 26A if so desired.

In order to secure the cover 20 to the wheel 10, a suitable adhesive 30 is used. Preferably, the adhesive 30 is selectively applied so as to be between the outer surface 14A of the disc 14 and an inner surface 20A of the wheel cover 20. The adhesive can be applied in a pre-assembly pattern so as to result in a full surface post-assembly pattern (not shown) or in a non-full surface post-assembly pattern, i.e., a post-assembly pattern which has voids or gaps 31 therein as shown in FIG. 1. Suitable adhesives may include but are not limited to the use of one or a combination of more than one of adhesives selected from the group consisting of silicone, two-part epoxy, urethane, double-sided tape, expanding foam, and the like. Alternatively, the cover 20 may be secured by other suitable materials and/or other suitable processes if so desired.

Figure 2:
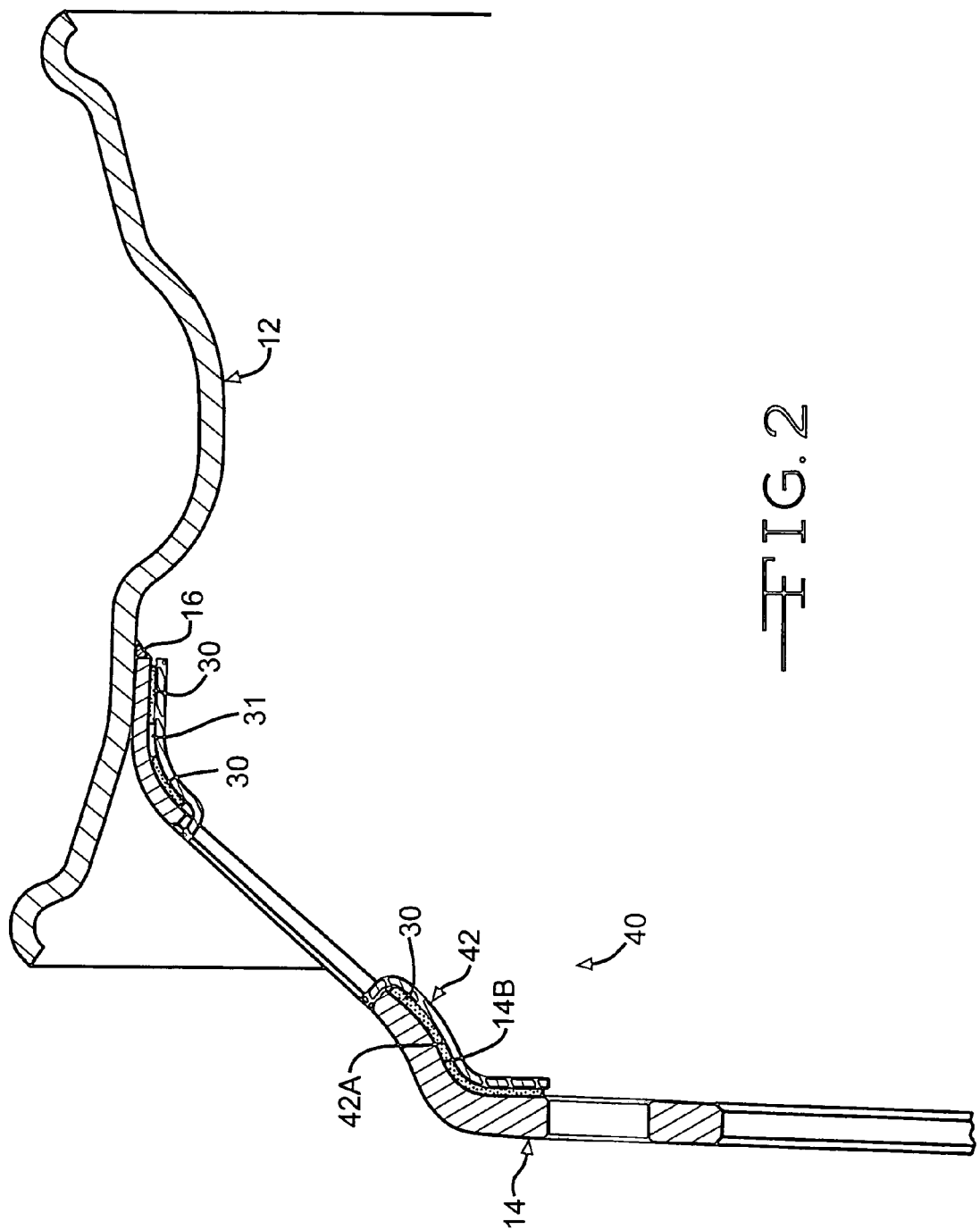
FIG. 2 is an enlarged view of a portion of a vehicle wheel including a second embodiment of a wheel cover retention system.

Turning now to FIG. 2 and using like reference number to indicate corresponding parts, there is illustrated a portion of a vehicle wheel, indicated generally at 40, including a second embodiment of a vehicle wheel cover retention system. In this embodiment, the wheel 40 is preferably adapted for use in a dual wheel assembly in which the wheel 40 is the outer wheel of the dual wheel assembly such that a second surface 14B of the disc 14 is the outer surface of the wheel.

In this embodiment, a wheel cover 42 is secured to a second surface 14B of the disc 14. Preferably, the cover 42 is a one-piece integral cover but can be otherwise formed if so desired. In the illustrated embodiment, the wheel cover 42 is provided with a profile which generally corresponds to the adjacent inner surface or profile of the rim 12. Alternatively, the profile of the cover 42 can be other than illustrated if so desired.

In order to secure the cover 42 to the wheel 40, a suitable adhesive 30 is used. Preferably, the adhesive 30 is selectively applied so as to be between the inner surface 14B of the disc 14 and an. inner surface 42A of the wheel cover 42. The adhesive can be applied in a pre-assembly pattern so as to result in a full surface post-assembly pattern or in a non-full surface post-assembly pattern, i.e., a post-assembly pattern which has voids or gaps 29 therein. Suitable adhesives can include but are not limited to the use of one or a combination of more than one of adhesives selected from the group consisting of silicone, two-part epoxy, urethane, double-sided tape, expanding foam, and the like. Alternatively, the cover 42 may be secured by other suitable materials and/or other suitable processes if so desired. Also, in addition to the wheel cover 42 secured to the second surface 14B, if so desired, the wheel 40 may also have the wheel cover secured to the first surface 14A thereof as shown in connection with the embodiment of the wheel 10 illustrated in FIG. 1.

Turning now to FIGS. 3 and 3A to 3E and using like reference number to indicate corresponding parts, there is illustrated a portion of a vehicle wheel, indicated generally at 60, including a third embodiment of a vehicle wheel cover retention system. In this embodiment, a wheel cover 62 is secured to the first surface 14A of the disc 14 and the first surface 12A of the wheel rim 12. The wheel cover 62 can be formed of any suitable material, such as plastic or metal, and may be treated or coated to produce a desired surface finish. Preferably, the cover 62 is a one-piece integral cover but can be otherwise formed if so desired. In the illustrated embodiment, the wheel cover 62 is provided with a profile which generally corresponds to the adjacent outer surface or profile of the disc 14. Alternatively, the profile of the cover 62 may be other than illustrated if so desired.

Figure 3D:
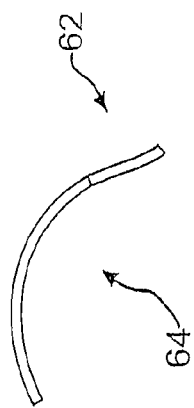
Figure 3E:
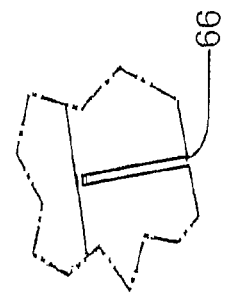
Figure 3C:
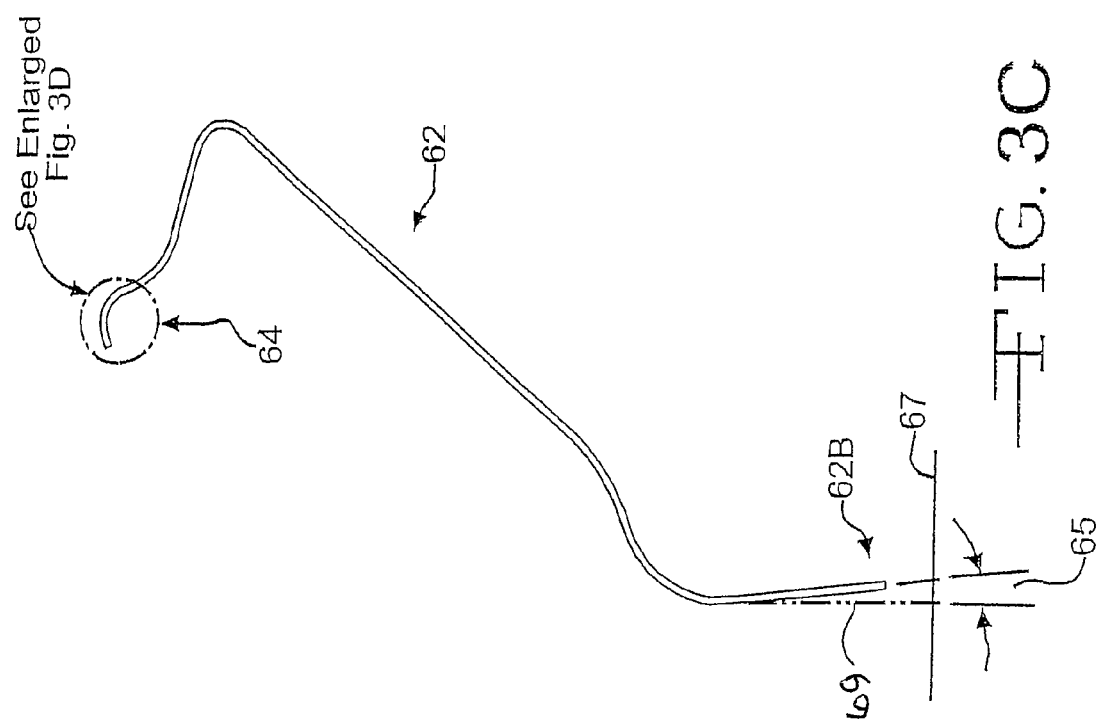

As shown in this embodiment, the wheel cover 62 includes an outer peripheral portion, indicated generally at 64, which is disposed adjacent or near the rim flange 25 of the rim 12. As best shown in FIGS. 3A, 3B and 3E, the outer peripheral portion 64 of the wheel cover 62 is provided with a series of cuts or slits 66 therein spaced circumferentially around the cover. Each pair of the cuts 66 is operative to define a tab 68 therebetween. The cuts 66 are provided to allow easier assembly of the cover 62 to the wheel 60 by allowing the cover 62 to flex during assembly. The particular number, size, and/or shape of the cuts 66 is dependent upon the particular wheel and cover designs. Alternatively, the outer peripheral portion 64 of the wheel cover 62 may be otherwise formed if so desired. For example, the outer peripheral portion may terminate further inwardly approximately below dashed line 65 if so desired. In such a design, the cuts 66 would preferably not be provided in the cover 62. Also, as shown in FIG. 3C, the cover 62 includes an inner portion 62B which extends at an angle 65 relative to a line 69 which is perpendicular to a wheel axis 67.

In order to secure the cover 62 to the wheel 60, a suitable adhesive 30 is used. Preferably, the adhesive 30 is selectively applied so as to be between the outer surface 14A of the disc 14 and an inner surface 62A of the wheel cover 62. The adhesive can be applied in a pre-assembly pattern so as to result in a full surface post-assembly pattern or in a non-full surface post-assembly pattern, i.e., a post-assembly pattern which has voids or gaps therein. Suitable adhesives can include but are not limited to the use of one or a combination of more than one of adhesives selected from the group consisting of silicone, two-part epoxy, urethane, double-sided tape, expanding foam, and the like. Alternatively, the cover 62 may be secured by other suitable materials and/or other suitable processes if so desired.

Turning now to FIG. 4 and using like reference number to indicate corresponding parts, there is illustrated a portion of a vehicle wheel, indicated generally at 80, including a fourth embodiment of a vehicle wheel cover retention system. In this embodiment, a two-piece wheel cover, indicated generally at 82, is secured to a second surface 14B of the disc 14.

In this embodiment, the cover 82 is preferably at least two pieces because an inner diameter D1 of the well 23 W of the rim 12 of the wheel 80 is less that an inner diameter D2 of the disc 14 of the wheel 80 at the attachment or weldment 16. The wheel cover 82 shown in this embodiment is especially useful in dual wheel type constructions so as to secure the wheel cover 82 on the inner surface of the wheel disc 14 of the outer wheel of the dual wheel assembly.

In the illustrated embodiment, the cover 82 includes a first cover 84 and a second cover 86. The first cover 84 is provided with a profile which generally corresponds to the adjacent inner surface or profile of the disc 14, except for an outer connection portion 84A. The second cover 86 is provided with a profile which generally corresponds to the adjacent inner surface or profile of the rim 12, except for an outer connection portion 86A. The outer connecting portions 84A and 86A preferably overlap each other and may be connected together in any suitable manner, such as for example by adhesive, glue, tape, or can be left loose. Alternatively, the profile of the cover 82 may be other than illustrated if so desired. Also, in this embodiment, the two wheel covers 84 and 86 may be made from the same materials or different materials.

Figure 5:
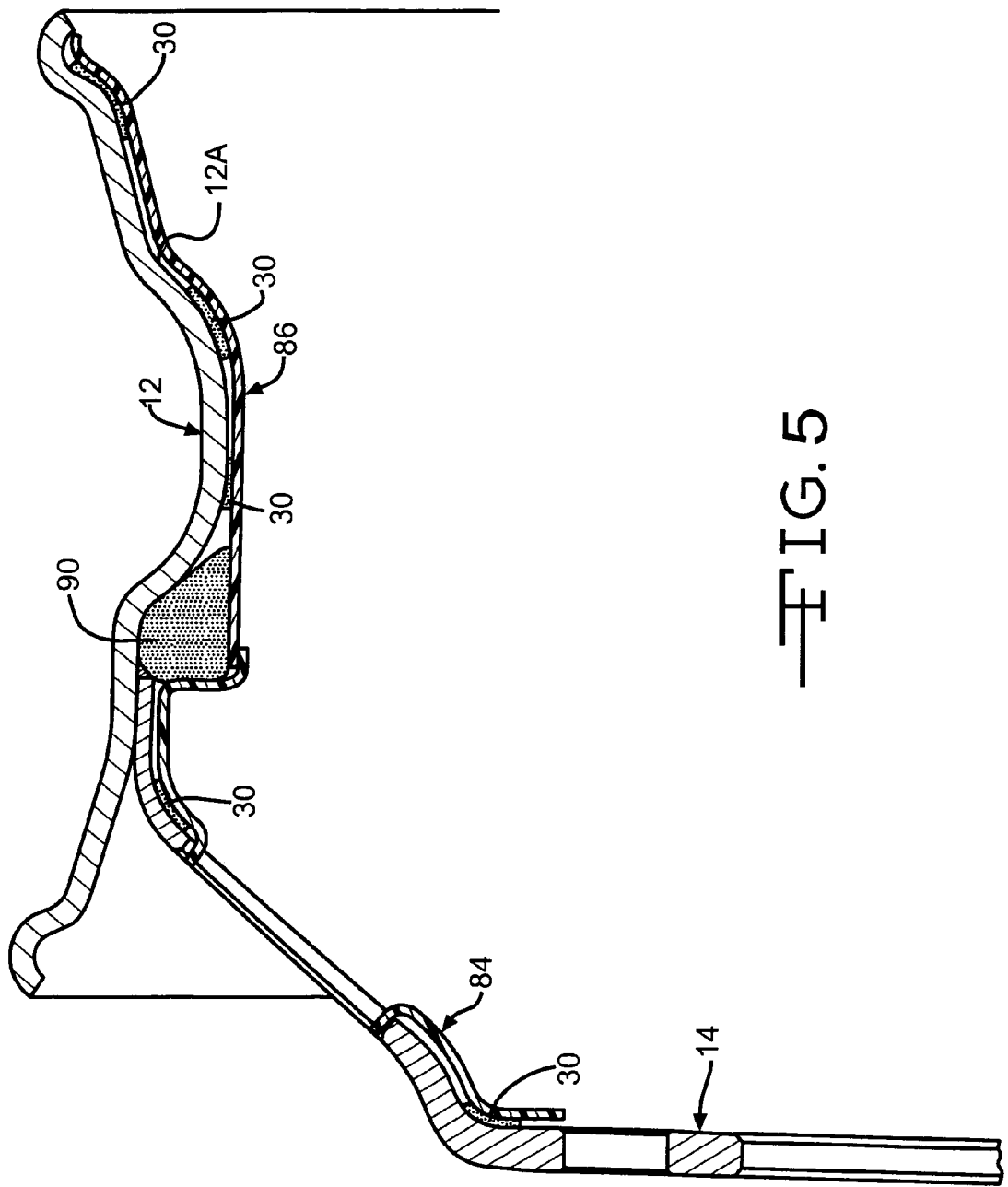
FIG. 5 is an enlarged view of a portion of a vehicle wheel including a fifth embodiment of a wheel cover retention system.

In order to secure the cover 82 to the wheel 80, a suitable adhesive 30 is used. Preferably, the adhesive 30 is selectively applied so as to be between the second surface 14B of the disc 14 and an inner surface 84B of the first wheel cover 84, and between the first surface 12A of the rim 12 and an inner surface 86B of the second wheel cover 86. Also, a filler ring (shown in phantom in FIG. 4 at 88), formed from a suitable material may be used if desired. Also, in conjunction with the filler ring 88 or in place thereof, a suitable expanding or foaming type of adhesive (shown in the embodiment of FIG. 5 at 90), may be used as shown if desired. The adhesive 30 may be applied in a pre-assembly pattern so as to result in a full surface post-assembly pattern or in a non-full surface post-assembly pattern, i.e., a post-assembly pattern which has voids or gaps 31 therein. Suitable adhesives may include but are not limited to the use of one or a combination of more than one of adhesives selected from the group consisting of silicone, two-part epoxy, urethane, double-sided tape, expanding foam, and the like. Alternatively, the cover 82 may be secured by other suitable materials and/or other suitable processes if so desired. Also, in addition to the wheel covers 84 and 86 secured thereto, if so desired, the wheel 80 may also have the wheel cover 62 secured to the first surface 14A thereof as shown in connection with the embodiment of the wheel 60 illustrated in FIG. 3.

Figures 6A, 6B:
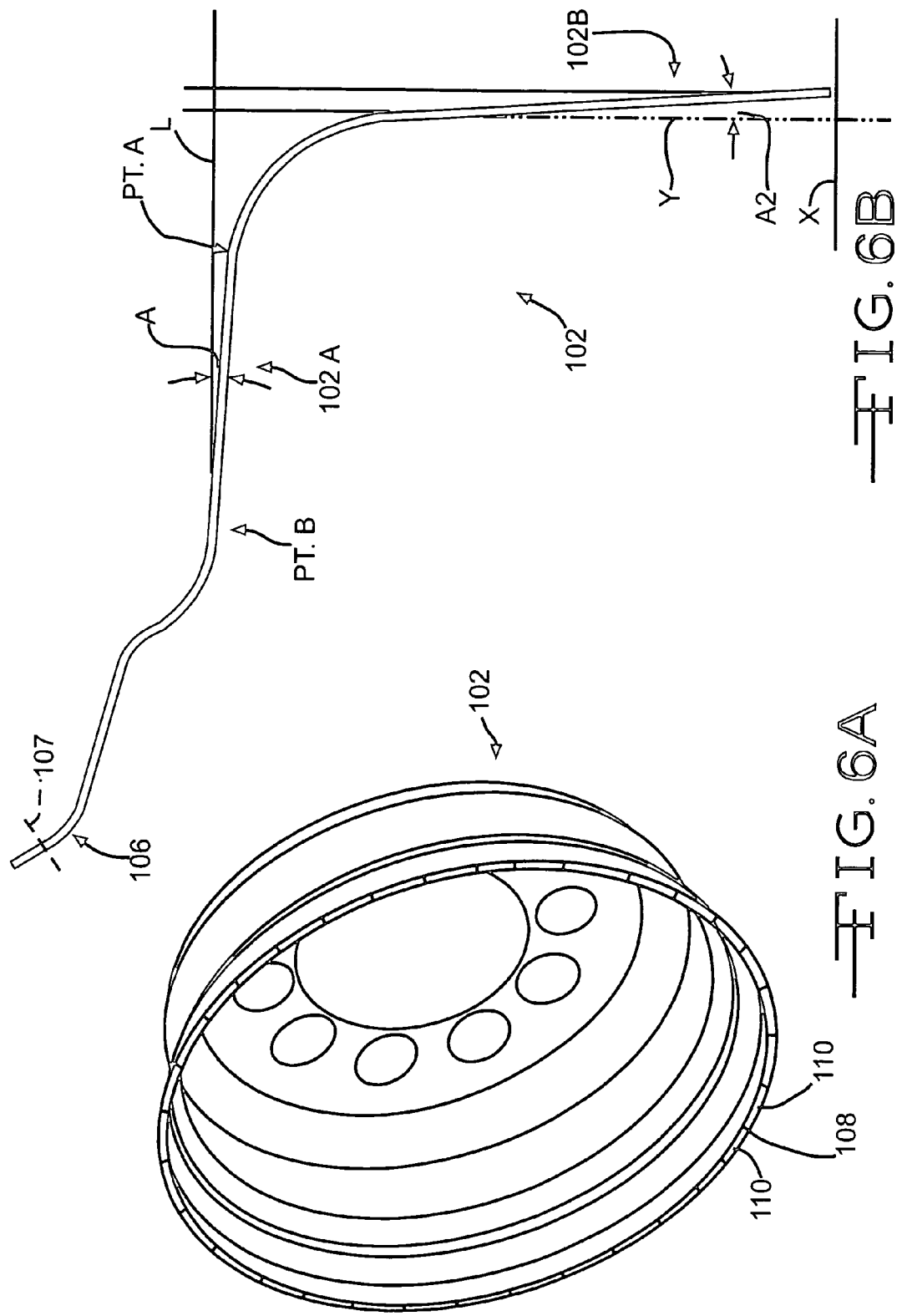
FIGS. 6A and 6B are selected views of the vehicle wheel illustrated in FIG. 6.

Turning now to FIGS. 6, 6A and 6B and using like reference number to indicate corresponding parts, there is illustrated a portion of a vehicle wheel, indicated generally at 100, including a sixth embodiment of a vehicle wheel cover retention system. In this embodiment, a wheel cover, indicated generally at 102, is secured to the first surface 14A of the disc 14 and the first surface 12A of the wheel rim. Preferably, the cover 102 is a one-piece integral cover but can be otherwise formed if so desired. In the illustrated embodiment, the wheel cover 102 is provided with a profile along one or more portions thereof which generally corresponds to the adjacent surfaces or profiles of the rim 12 and/or the disc 14. Alternatively, the profile of the cover 102 can be other than illustrated if so desired.

As best shown in FIG. 6B, in this embodiment, the wheel cover 102 includes a first or outer portion generally indicated at 102A which extends at an angle from about a point A to about a point B. The wheel cover portion 102A extends at an angle A with respect to a line L which is parallel relative to the wheel axis X (as shown in FIG. 6B). In the illustrated embodiment, the angle A preferably in the range from about 1 degree to about 5 degrees; however, the angle A can be other than illustrated if so desired. Also, as shown in FIG. 6B, the cover 102 includes a second or inner portion 102B which extends at an angle A2 relative to a line Y which is perpendicular relative to the wheel axis X. The cover portion 102B is preferably at the angle A2 to compensate for offset variation in the wheel.

As shown in this embodiment, the wheel cover 102 includes an outer peripheral portion 106 which is disposed adjacent or near the rim flange 25 of the rim 12. As best shown in FIG. 6A, the outer peripheral portion 106 of the wheel cover 102 is provided with a series of cuts or slits 108 therein spaced circumferentially around the cover. Each pair of the cuts 108 is operative to define a tab 110 therebetween. The cuts 108 are provided to allow easier assembly of the cover 102 to the wheel 100 by allowing the cover 102 to flex during assembly. As can be seen in FIG. 6, when the wheel cover 102 is assembled onto the associated vehicle wheel 100, the outer peripheral portion 106 of the wheel cover 102 follows and covers the adjacent outer surface of the rim flange 25 and the cuts 108 provided in the outer peripheral portion 106 of the wheel cover 102 are visible and directly engage at least a portion of the rim flange 25. To accomplish this in the illustrated embodiment as can be seen in FIG. 6, the outer peripheral portion 106 is curved having a generally C-shaped surface profile which extends radially inwardly to extend toward the wheel axis X so as to generally conform to the adjacent surface profile of the rim flange 25, which also is curved and has a generally C-shaped surface profile which extends radially inwardly to extend toward the wheel axis X. The particular number, size and/or shape of the cuts 108 is dependent upon the particular wheel and cover designs. Alternatively, the outer peripheral portion 106 of the wheel cover 102 may be otherwise formed if so desired. For example, as shown in FIG. 6B, the outer peripheral portion may terminate further inwardly approximately below dashed line 107 if so desired. In such a design, the cuts 108 would preferably not be provided in the cover 102.

In order to secure the cover 102 to the wheel 100, a suitable adhesive 30 and/or adhesives and/or filler ring are used. Preferably, the adhesive 30 is selectively applied so as to be between the outer surface 14A of the disc 14 and an inner surface 102A of the wheel cover 102. The adhesive can be applied in a pre-assembly pattern so as to result in a full surface post-assembly pattern or in a non-full surface post-assembly pattern, i.e., a post-assembly pattern which has voids or gaps 31 therein. Suitable adhesives may include but are not limited to the use of one or a combination of more than one of adhesives selected from the group consisting of silicone, two-part epoxy, urethane, double-sided tape, expanding foam, and the like. Alternatively, the cover 102 may be secured by other suitable materials and/or other suitable processes if so desired. Also, in that portion of the wheel cover 102 which does not closely follow the surfaces of the rim 12 and/or the disc 14, a filler ring and/or an expanding or foaming type adhesive (both schematically indicated in phantom in FIG. 6 by reference number 112), may be used if so desired.

Turning now to FIGS. 7, 7A and 7B and using like reference number to indicate corresponding parts, there is illustrated a portion of a vehicle wheel, indicated generally at 120, including a seventh embodiment of a vehicle wheel cover retention system. In this embodiment, a wheel cover, indicated generally at 122, is secured to the first surface 14A of the disc 14 and the first surface 12A of the wheel rim 12. Preferably, the cover 122 is a one-piece integral cover but may be otherwise formed if so desired. In the illustrated embodiment, the wheel cover 122 is provided with a profile along one or more portions thereof which generally corresponds to the adjacent surfaces or profiles of the rim 12 and/or the disc 14. Alternatively, the profile of the cover 122 may be other than illustrated if so desired.

As shown in this embodiment, the wheel cover 122 includes a first outer portion generally indicated at 122A which extends at an angle from about a point C to about a point D. The wheel cover portion 122A extends at an angle A1 with respect to a line L1 which is parallel relative to the wheel axis X (as shown in FIG. 7B). In the illustrated embodiment, the angle A1 is in the range from about 1 degree to about 5 degrees; however, the angle A1 may be other than illustrated if so desired. Preferably, the angle A1 of FIG. 7B and the angle A of FIG. 6B are predetermined so that one set of tooling can be used to produce both the wheel cover 102 shown in FIG. 6 and the wheel cover 122 shown in FIG. 7. Also, as shown in FIG. 7B, the cover 122 includes an inner portion 122B which extends at an angle A3 relative to a line Y which is perpendicular to the wheel axis X. The cover portion 122B being at the angle A3 is provided to compensate for offset variation.

As shown in this embodiment, the wheel cover 122 includes an outer peripheral portion 126 which is disposed adjacent or near the rim flange 25 of the rim 12. As best shown in FIG. 7A, the outer peripheral portion 126 of the wheel cover 122 is provided with a series of cuts or slits 128 therein spaced circumferentially around the cover. Each pair of the cuts 128 is operative to define a tab 130 therebetween. The cuts 128 are provided to allow easier assembly of the cover 122 to the wheel 120 by allowing the cover 122 to flex during assembly. The particular number, size and/or shape of the cuts 128 is dependent upon the particular wheel and cover designs. Alternatively, the outer peripheral portion 126 of the wheel cover 122 may be otherwise formed if so desired. For example, as shown in FIG. 7B, the outer peripheral portion may terminate further inwardly approximately below dashed line 127 if so desired. In such a design, the cuts 128 would preferably not be provided in the cover 122.

In order to secure the cover 122 to the wheel 120, a suitable adhesive 30 and/or adhesives and/or filler ring are used. Preferably, the adhesive 30 is selectively applied so as to be between the outer surface 14A of the disc 14 and an inner surface 122A of the wheel cover 122. The adhesive can be applied in a pre-assembly pattern so as to result in a full surface post-assembly pattern or in a non-full surface post-assembly pattern, i.e., a post-assembly pattern which has voids or gaps 31 therein. Suitable adhesives may include but are not limited to the use of one or a combination of more than one of adhesives selected from the group consisting of silicone, two-part epoxy, urethane, double-sided tape, expanding foam, and the like. Alternatively, the cover 122 may be secured by other suitable materials and/or other suitable processes if so desired. Also, in that portion of the wheel cover 122 which does not closely follow the surfaces of the rim 12 and/or the disc 14, a filler ring and/or an expanding or foaming type adhesive (both schematically indicated in phantom in FIG. 7 by reference number 132), may be used if so desired.

Figure 8:
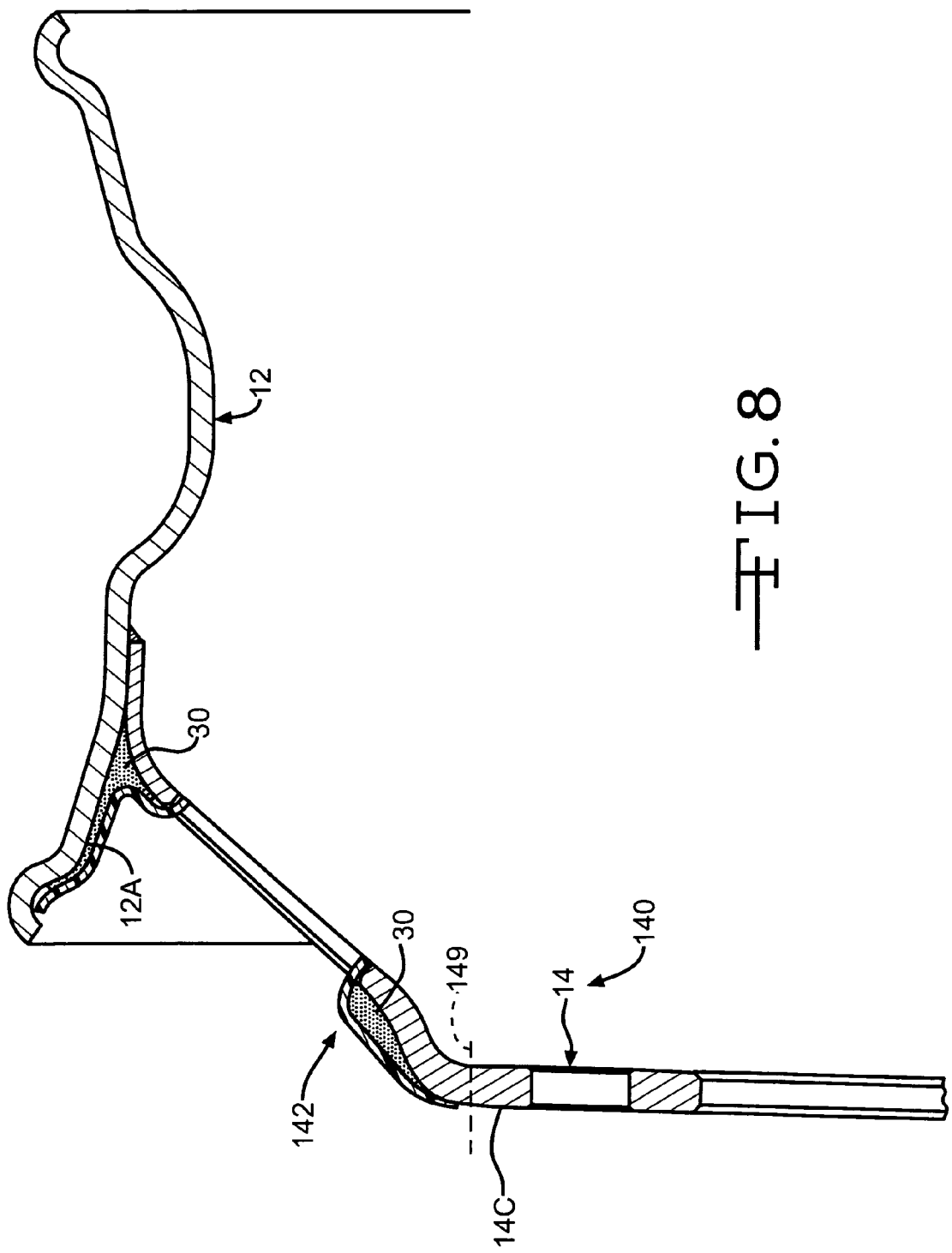
FIG. 8 is an enlarged view of a portion of a vehicle wheel including an eighth embodiment of a wheel cover retention system.

Turning now to FIG. 8 and using like reference number to indicate corresponding parts, there is illustrated a portion of a vehicle wheel, indicated generally at 140, including an eighth embodiment of a vehicle wheel cover retention system. This embodiment is generally similar to that shown in FIG. 1 except for the outer profile of the wheel cover 142 is different that that of the wheel cover 20 and that the wheel cover 142 does not extend inwardly past a dashed line 149 so as to be disposed adjacent a generally flat surface 14C of the disc 14. Depending upon the particular wheel design, the surface 14C may either be the wheel mounting surface of the disc or a surface which is opposite and parallel with respect to the wheel mounting surface.

The reason for not extending the wheel cover 142 inwardly so as to be against the wheel mounting surface of the disc is that in case the wheel is mounting incorrectly in either in a single wheel assembly or in a dual wheel assembly, the cover would not be clamped between the wheel mounting surface and the associated member of the vehicle in the single wheel assembly or clamped between the wheel mounting surfaces of the two wheels in the dual wheel assembly. Also, with the cover 142 not having an inner portion extending past the line 149, the cover 142 may allow for extra flex of the cover to compensate for offset variation.

Figure 9:
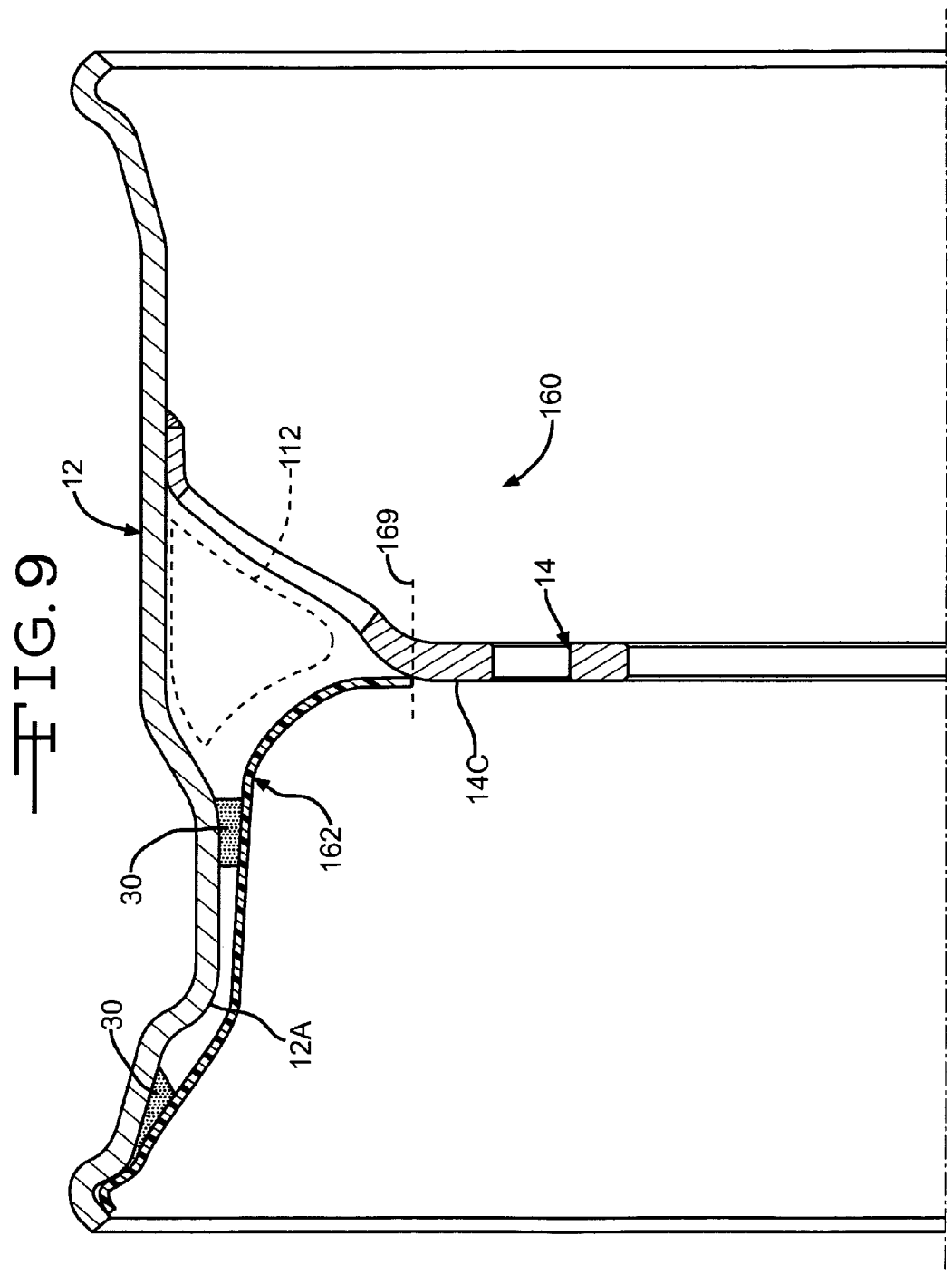
FIG. 9 is an enlarged view of a portion of a vehicle wheel including a ninth embodiment of a wheel cover retention system.

Turning now to FIG. 9 and using like reference number to indicate corresponding parts, there is illustrated a portion of a vehicle wheel, indicated generally at 160, including an ninth embodiment of a vehicle wheel cover retention system. This embodiment is generally similar to that shown in FIG. 6 except that the wheel cover 162 does not extend inwardly past a dashed line 169 so as to be disposed against the generally flat surface 14C of the disc 14. Depending upon the particular wheel design, the surface 14C may either be the wheel mounting surface of the disc or a surface which is opposite and parallel with respect to the wheel mounting surface.

The reason for not extending the wheel cover 162 inwardly so as to be against the wheel mounting surface of the disc is that in case the wheel is mounting incorrectly in either in a single wheel assembly or in a dual wheel assembly, the cover would not be clamped between the wheel mounting surface and the associated member of the vehicle in the single wheel assembly or clamped between the wheel mounting surfaces of the two wheels in the dual wheel assembly. Also, with the cover 162 not having an inner portion extending past the line 169, the cover 162 may allow for extra flex of the cover to compensate for offset variation.

Figure 10:
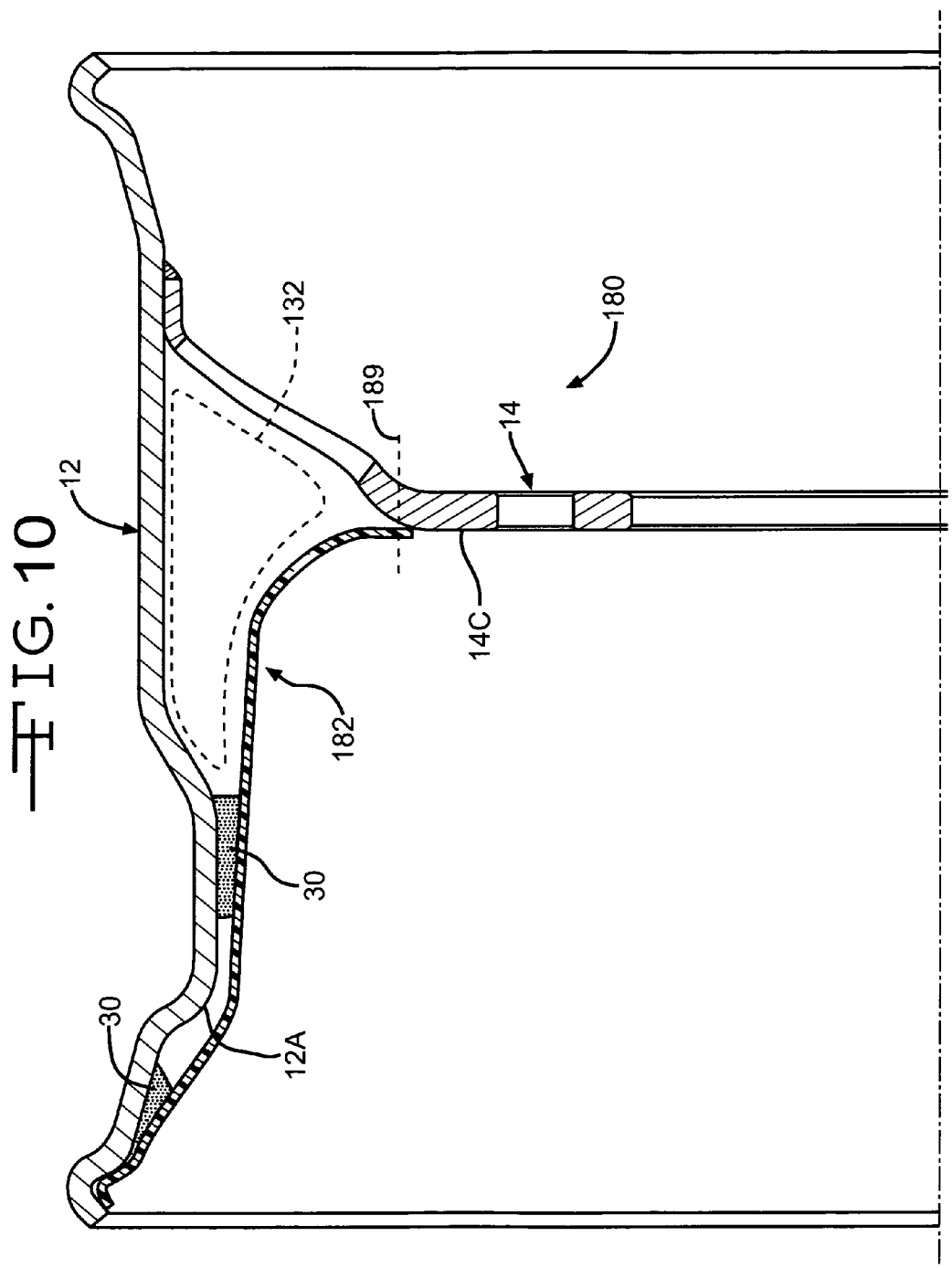
FIG. 10 is an enlarged view of a portion of a vehicle wheel including a tenth embodiment of a wheel cover retention system.

Turning now to FIG. 10 and using like reference number to indicate corresponding parts, there is illustrated a portion of a vehicle wheel, indicated generally at 180, including an tenth embodiment of a vehicle wheel cover retention system. This embodiment is similar to that shown in FIG. 7 except that the wheel cover 182 does not extend inwardly past a dashed line 189 so as to be disposed against the generally flat surface 14C of the disc 14. Depending upon the particular wheel design, the surface 14C may either be the wheel mounting surface of the disc or a surface which is opposite and parallel with respect to the wheel mounting surface.

The reason for not extending the wheel cover 182 inwardly so as to be against the wheel mounting surface of the disc is that in case the wheel is mounting incorrectly in either in a single wheel assembly or in a dual wheel assembly, the cover would not be clamped between the wheel mounting surface and the associated member of the vehicle in the single wheel assembly or clamped between the wheel mounting surfaces of the two wheels in the dual wheel assembly. Also, with the cover 182 not having an inner portion extending past the line 189, the cover 182 may allow for extra flex of the cover to compensate for offset variation.

Figure 11:
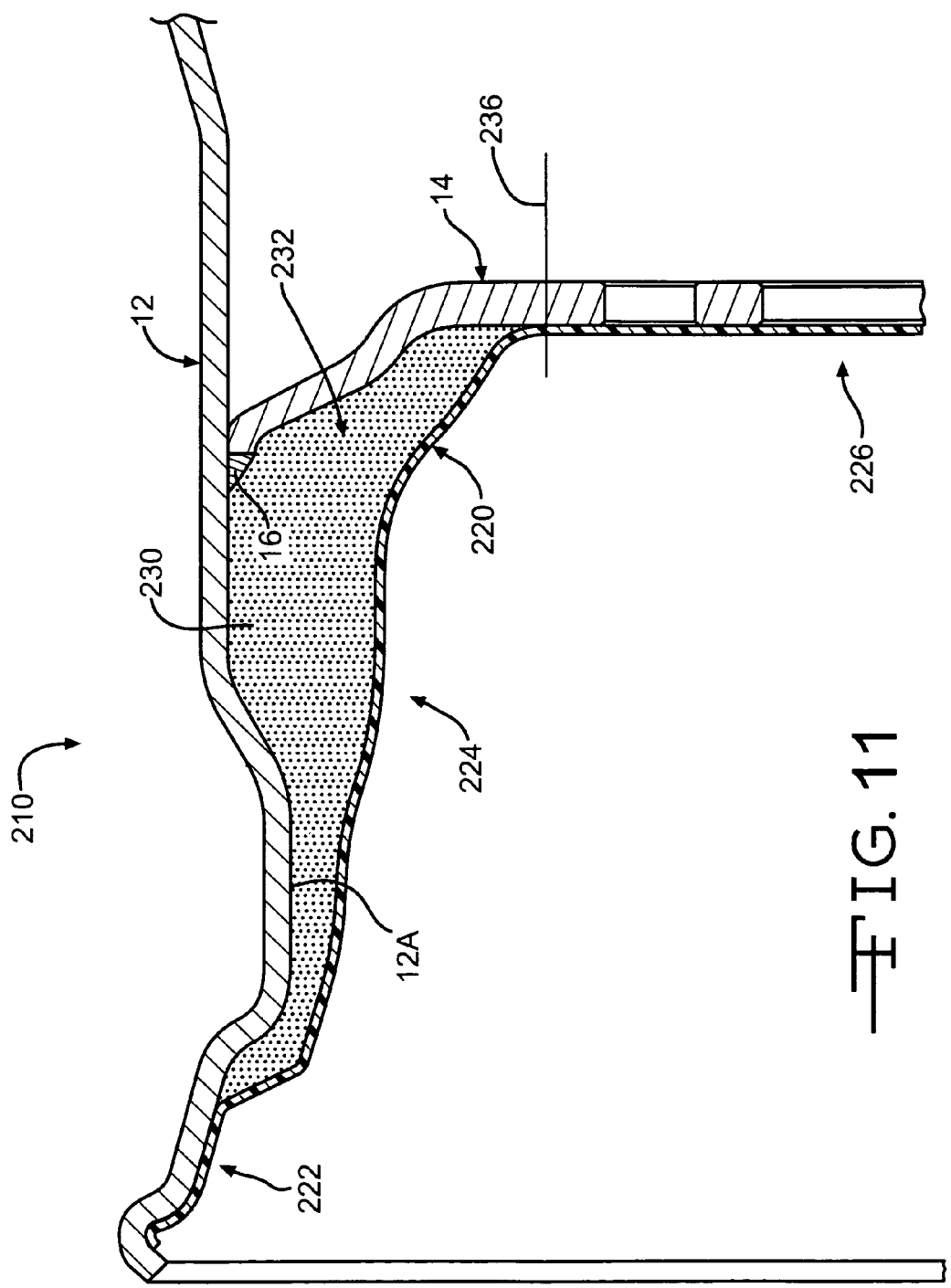
FIG. 11 is an enlarged view of a portion of a vehicle wheel including an eleventh embodiment of a wheel cover retention system.

Referring now to FIG. 11 and using like reference number to indicate corresponding parts, there is illustrated a portion of a vehicle wheel, indicated generally at 210, including an eleventh embodiment of a wheel cover retention system. In this embodiment, the vehicle wheel 210 is illustrated as being a low-offset fabricated type of wheel (i.e., a non-full face type of vehicle wheel).

As shown in FIG. 11, the vehicle wheel 210 includes a wheel cover 220 secured thereto. The wheel cover 220 may be formed of any suitable material, such as plastic or metal, and can be treated or coated to produce a desired surface finish. Preferably, the cover 220 is a one-piece integral cover but may be otherwise formed if so desired.

In the illustrated embodiment, the wheel cover 220 includes a first or outer portion, indicated generally at 222, a second or intermediate portion, indicated generally at 224, and a third or inner portion, indicated generally at 226. The first portion 22 is provided with a profile which generally corresponds to the adjacent surface or profile of the rim 12. The second portion 224 is provided with a profile having portions which generally correspond to the adjacent surface or profile of the rim 12 and/or the disc 14 and portions which do not generally correspond to the adjacent surface or profile of the rim 12 and/or the disc 14. The third portion 226 is provided with a profile which generally corresponds to the adjacent surface or profile of the disc 14. Alternatively, the profile of the cover 220 can be other than illustrated if so desired. For example, as shown in FIG. 1, the wheel cover 220 could only comprise that portion which is located above a line 236; the exact location of the line 236 may be other than illustrated if so desired.

In order to secure the cover 220 to the wheel 210, preferably a foam filler material 230 is used. As shown in FIG. 11, the foam filler material 230 is preferably disposed a cavity 232 defined between the second portion 224 of the wheel cover 220 and the associated surfaces of the rim 12 and the disc 14. Alternatively, the cover 220 may be secured by other suitable materials and/or other suitable processes if so desired. Also, the selected material may be selectively applied and not fill the entire cavity 232. In addition to having a selected material in the cavity, the material can also be applied, selectively or in entirety, between the first portion 222 of the cover 220 and the adjacent surface of the rim 12 and/or between the third portion 226 of the cover 20 and the adjacent surface of the disc 14.

Figure 12:
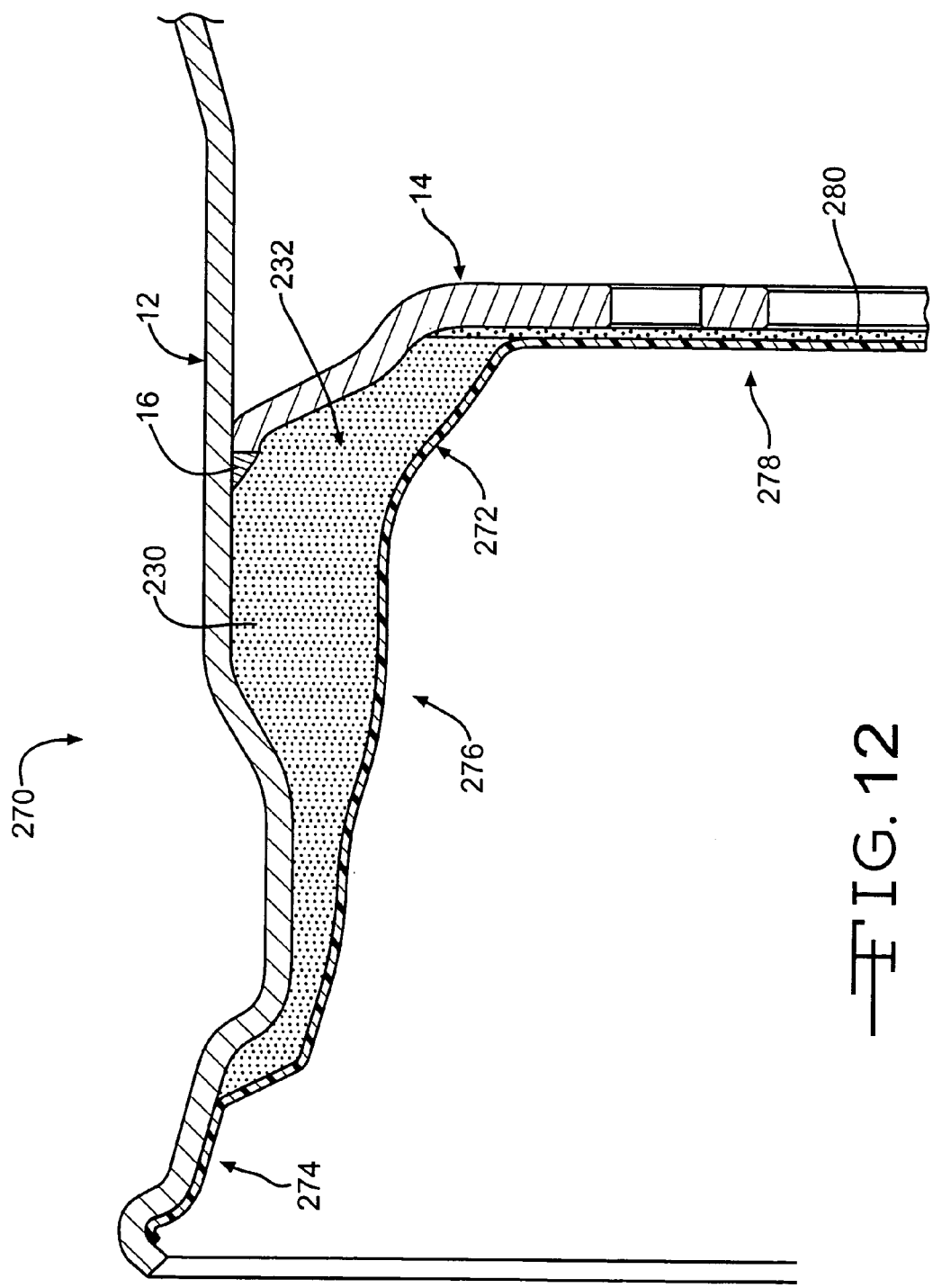
FIG. 12 is an enlarged view of a portion of a vehicle wheel including a twelfth embodiment of a wheel cover retention system.

Turning now to FIG. 12 and using like reference number to indicate corresponding parts, there is illustrated a portion of a vehicle wheel, indicated generally at 270, including a twelfth embodiment of a vehicle wheel cover retention system. In this embodiment, the wheel 270 is a low-offset fabricated type of wheel having a wheel cover 272 secured thereto as will be discussed below. The wheel cover 272 includes a first or outer portion, indicated generally at 274, a second or intermediate portion, indicated generally at 276, and a third or inner portion, indicated generally at 278.

The first portion 274 is provided with a profile which generally corresponds to the adjacent surface or profile of the rim 12. The second portion 276 is provided with a profile having portions which generally correspond to the adjacent surface or profile of the rim 12 and/or the disc 14 and portions which do not generally correspond to the adjacent surface or profile of the rim 12 and/or the disc 14. The third portion 278 is provided with a profile which generally corresponds to the adjacent surface or profile of the disc 14. Alternatively, the profile of the cover 272 may be other than illustrated if so desired.

In this embodiment, prior to securing the wheel cover 272 to the wheel 270, an annular or ring-like member 280 is formed onto or otherwise secured to the disc 14. The member 280 may be of any suitable material, such as a foam material which is formed in situ thereon. After the member 280 is formed or otherwise first secured to the wheel 270, then the cover 272 is secured to the wheel 70, preferably using a suitable adhesive or adhesives 230. Alternatively, the cover 272 may be secured by other suitable materials and/or other suitable processes if so desired. Also, the selected material may be selectively applied and not fill the entire cavity 232. In addition to having a selected material in the cavity, the material can also be applied, selectively or in entirety, between the first portion 274 of the cover 272 and the adjacent surface of the rim 12 and/or between the third portion 278 of the cover 272 and the adjacent surface of the disc 14. Also, the material 230 may be non-continuous and/or non-uniform if so desired.

One advantage of the present invention is that in a non-full face type of wheel construction, the variations between the disc and the rim can be compensated for by the design of the wheel covers of the present invention. Also, an additional advantage is the use of the two-piece wheel covers of the present invention on a wheel that has the disc inner diameter larger than the well portion rim inner diameter. Also, the adhesive or filler materials may act as a filler to compensate for the offset variation in the wheel. Also, the adhesive or filler materials may serve as a bonding agent for securing the cover to the wheel. In addition, the adhesive or filler materials may be operative to prevent contaminants from getting between the wheel and the cover. Further, the adhesive or filler materials may act as a dampener to prevent rubbing and noise between the cover and the wheel.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A vehicle wheel cover retention system for a non-full face fabricated vehicle wheel comprising:
    a full outer wheel rim formed from a suitable material and including a first run flange, a first tire bead seat, a well, a second tire bead seat, and a second rim flange, said full outer wheel rim defining a first surface extending between said first and second rim flanges wherein said first rim flange is outboard of said first tire bead seat;
    an inner wheel disc defining a wheel axis and formed from a suitable material and joined to said full outer wheel rim, said inner wheel disc including a centrally located wheel mounting surface and an outer annular portion, said inner wheel disc having a first surface and a second surface; and
    a wheel cover formed from a suitable material and secured to at least one of said first surface of said inner wheel disc, said second surface of said inner wheel disc, and said first surface of said full outer wheel rim;
    wherein said wheel cover includes a shape corresponding to said first tire bead seat and an outer peripheral portion which is disposed adjacent said first run flange, said outer peripheral portion defining a portion of an exterior outer surface of said wheel cover which is visible when said wheel cover is secured to said at least one of said first surface of said inner wheel disc, said second surface of said inner wheel disc, and said first surface of said full outer wheel rim;
    wherein said outer peripheral portion of said wheel cover is provided with a plurality of slits formed therein spaced circumferentially around said outer peripheral portion of said wheel cover with each pair of slits defining a tab therebetween, wherein said slits directly engage said first rim flange and wherein said slits, being on said outer peripheral portion of said wheel cover which defines a portion of said exterior outer surface of said wheel cover, are also visible when said wheel cover is secured to said at least one of said first surface of said inner wheel disc, said second surface of said inner wheel disc, and said first surface of said full outer wheel rim;
    wherein said first rim flange includes a curved C-shaped surface profile which extends radially inwardly to extend toward said wheel axis;
    wherein said outer peripheral portion of said wheel cover includes a correspondingly formed curved C-shaped surface profile which extends radially inwardly to extend toward said wheel axis so as to be disposed adjacent to and conform to said curved c-shaped surface profile of said first rim flange;
    wherein said slits are disposed in said curved C-shaped surface profile of said wheel cover.

2. The vehicle wheel cover retention system of claim 1 wherein said non-full face fabricated wheel is for use in a commercial vehicle as either a single wheel assembly or as part of a dual wheel assembly.

3. The vehicle wheel cover retention system of claim 1 wherein said full outer wheel rim and said inner wheel disc are formed from materials selected from the group consisting of steel, aluminum, and alloys thereof.

4. The vehicle wheel cover retention system of claim 1 wherein said full outer wheel rim and said inner wheel disc are joined by welding.

5. The vehicle wheel cover retention system of claim 1 wherein said wheel cover is secured to said at least one of said first surface of said maser wheel disc, said second surface of said inner wheel disc, and said first surface of said full outer wheel rim by at least one adhesive.

6. The vehicle wheel cover retention system of claim 1 wherein said at least one adhesive results in one of a full surface post-assembly pattern and a non-full surface post-assembly pattern.

7. The vehicle wheel cover retention system of claim 1 wherein said wheel cover includes an outer portion which extends at an angle with respect to a line which is parallel relative to said wheel axis.

8. The vehicle wheel cover retention system of claim 1 wherein said wheel cover includes an inner portion which extends at an angle relative to a line which is perpendicular relative to said wheel axis.

9. The vehicle wheel cover retention system of claim 1 wherein said wheel cover includes an inner portion thereof which is disposed adjacent said centrally located wheel mounting surface of said inner wheel disc.

10. The vehicle wheel cover retention system of claim 1 wherein said wheel cover does not include an inner portion thereof which is disposed adjacent said centrally located wheel mounting surface of said inner wheel disc.

11. The vehicle wheel cover retention system of claim 1 wherein said tab allows said wheel cover to flex during assembly.

12. A vehicle wheel cover retention system for a non-full face fabricated vehicle wheel comprising:
    a full outer wheel rim formed from a suitable material and including a first rim flange, a first tire bead seat, a well, a second tire bead seat, and a second rim flange, said full outer wheel rim defining a first surface extending between said first and second rim flanges wherein said first rim flange is outboard of said first tire bead seat;
    an inner wheel disc defining a wheel axis and formed from a suitable material and welded to said full outer wheel rim, said inner wheel disc including a centrally located wheel mounting surface and an outer annular portion, said inner wheel disc having a first surface and a second surface; and
    a wheel cover formed from a suitable material and secured to at least one of said first surface of said inner wheel disc, said second surface of said inner wheel disc, and said first surface of said full outer wheel rim by at least one adhesive;

wherein said wheel cover includes a shape corresponding to said first tire bead seat and an outer peripheral portion which is disposed adjacent said first rim flange, said outer peripheral portion defining a portion of an exterior outer surface of said wheel cover which is visible when said wheel cover is secured to said at least one of said first surface of said inner wheel disc, said second surface of said inner wheel disc, and said first surface of said full outer wheel rim;

wherein said outer peripheral portion of said wheel cover is provided with a plurality of slits formed therein spaced circumferentially around said outer peripheral portion of said wheel cover with each pair of slits defining a tab therebetween, wherein said slits directly engage said first rim flange and wherein said slits, being on said outer peripheral portion of said wheel cover which defines a portion of said exterior outer surface of said wheel cover, are also visible when said wheel cover is secured to said at least one of said first surface of said inner wheel disc, said second surface of said inner wheel disc, and said first surface of said full outer wheel rim;

wherein said first rim flange includes a curved C-shaped surface profile which extends radially inwardly to extend toward said wheel axis;

wherein said outer peripheral portion of said wheel cover includes a correspondingly formed curved C-shaped surface profile which extends radially inwardly to extend toward said wheel axis so as to be disposed adjacent to and conform to said C-shaped curved surface profile of said first rim flange;

wherein said slits are disposed in said curved C-shaped surface profile of said wheel cover.

13. The vehicle wheel cover retention system of claim 12 wherein said non-full face fabricated vehicle wheel is for use in a commercial vehicle as either a single wheel assembly or as part of a dual wheel assembly.

14. The vehicle wheel cover retention system of claim 12 wherein said at least one adhesive results in one of a full surface post-assembly pattern and a non-full surface post-assembly pattern.

15. The vehicle wheel cover retention system of claim 12 wherein said wheel cover includes an outer portion which extends at an angle with respect to a line which is parallel relative to said wheel axis.

16. The vehicle wheel cover retention system of claim 12 wherein said wheel cover includes an inner portion which extends at an angle relative to a line which is perpendicular relative to said wheel axis.

17. The vehicle wheel cover retention system of claim 12 wherein said wheel cover includes an inner portion thereof which is disposed adjacent said centrally located wheel mounting surface of said inner wheel disc.

18. The vehicle wheel cover retention system of claim 12 wherein said wheel cover does not include an inner portion thereof which is disposed adjacent said centrally located wheel mounting surface of said inner wheel disc.

19. The vehicle wheel cover retention system of claim 12 wherein said tab allows said wheel cover to flex during assembly.

20. A vehicle wheel cover retention system for a non-full face fabricated vehicle wheel comprising:

a full outer wheel rim formed from a suitable material and including a first rim flange, a first tire bead seat, a well, a second tire bead seat, and a second rim flange, said full outer wheel rim defining a first surface extending between said first and second rim flanges wherein said first rim flange is outboard of said first tire bead seat;

an inner wheel disc defining a wheel axis and formed from a suitable material and joined to said full outer wheel rim, said inner wheel disc including a centrally located wheel mounting surface and an outer annular portion, said inner wheel disc having a first surface and a second surface; and a wheel cover formed from a suitable material and secured to at least one of said first surface of said inner wheel disc, said second surface of said inner wheel disc, and said first surface of said full outer wheel rim;

wherein said wheel cover includes a shape corresponding to said first tire bead seat and an outer portion which extends at an angle with respect to a line which is parallel relative to said wheel axis and wherein said wheel cover includes an inner portion thereof which is disposed adjacent said centrally located wheel mounting surface of said inner wheel disc;

wherein said wheel cover includes an outer peripheral portion which is disposed adjacent said first rim flange, said outer peripheral portion defining a portion of an exterior outer surface of said wheel cover which is visible when said wheel cover is secured to said at least one of said first surface of said inner wheel disc, said second surface of said inner wheel disc, and said first surface of said full outer wheel rim;

wherein said outer peripheral portion of said wheel cover is provided with a plurality of slits formed therein spaced circumferentially around said outer peripheral portion of said wheel cover, wherein said slits directly engage said first rim flange and wherein said slits, being on said outer peripheral portion of said wheel cover which defines a portion of said exterior outer surface of said wheel cover, are also visible when said wheel cover is secured to said at least one of said first surface of said inner wheel disc, said second surface of said inner wheel disc, and said first surface of said full outer wheel rim;

wherein said first rim flange includes a curved C-shaped surface profile which extends radially inwardly to extend toward said wheel axis;

wherein said outer peripheral portion of said wheel cover includes a correspondingly formed curved C-shaped surface profile which extends radially inwardly to extend toward said wheel axis so as to be disposed adjacent to and conform to said C-shaped curved surface profile of said first rim flange;

wherein said slits are disposed in said curved C-shaped surface profile of said wheel cover; and wherein each pair of said slits defines a tab therebetween which allows said outer peripheral portion of said wheel cover to flex during assembly so that following assembly said outer peripheral portion is disposed adjacent to and conforms to said curved C-shaped surface profile of said rim flange.

* * * * *

UNITED STATES PATENT AND TRADEMARK OFFICE
CERTIFICATE OF CORRECTION

PATENT NO. : 7,758,131 B1 Page 1 of 1
APPLICATION NO. : 11/585324
DATED : July 20, 2010
INVENTOR(S) : Joseph W. Wolf et al.

It is certified that error appears in the above-identified patent and that said Letters Patent is hereby corrected as shown below:

Claim 1, Column 11, Line 32, delete the word "run" and insert the word --rim--;
Line 49, delete the word "run" and insert the word --rim--.

Claim 5, Column 12, Line 25, delete the word "maser" and insert the word --inner--.

Claim 12, Column 12, Line 58, after "flanges" insert a --,--.

Signed and Sealed this

Thirty-first Day of August, 2010

David J. Kappos
*Director of the United States Patent and Trademark Office*